United States Patent [19]

Takeda et al.

[11] Patent Number: 5,517,610

[45] Date of Patent: May 14, 1996

[54] PORTRAIT DRAWING APPARATUS HAVING FACIAL EXPRESSION DESIGNATING FUNCTION

[75] Inventors: Yumiko Takeda; Satoru Makino; Mina Kawai, all of Nagoya, Japan

[73] Assignee: Brother Kogyo Kabushiki Kaisha, Nagoya, Japan

[21] Appl. No.: 434,330

[22] Filed: May 2, 1995

Related U.S. Application Data

[63] Continuation of Ser. No. 69,367, Jun. 1, 1993, abandoned.

[51] Int. Cl.$^6$ .............................. G06F 15/00; G06F 12/00
[52] U.S. Cl. ........................................... 395/162; 395/164
[58] Field of Search ................................. 395/162–166

[56] References Cited

U.S. PATENT DOCUMENTS

| | | | |
|---|---|---|---|
| 4,926,344 | 5/1990 | Collins et al. | 395/62 |
| 5,111,409 | 5/1992 | Gasper et al. | 395/152 |
| 5,179,652 | 1/1993 | Rozmanith et al. | 395/155 |
| 5,212,769 | 5/1993 | Pong | 395/150 |

FOREIGN PATENT DOCUMENTS 4-208191  7/1992  Japan.

OTHER PUBLICATIONS

R. Curtis, S. Scarfone, "XFace, and XTool Presenting Multivariate Data, & Its Use with Software Metrics", IEEE, IPCCL '92 pp. 525–530.

S. Morishima, H. Harashima, "Image Synthesis & Editing Sys. for a Multi-Media Human Interface with Speaking Head", ICIP 270–3.

"Name Land KL–1200" (Owner's Manual) manufactured by CASIO, Oct. 1992.

A. Levi et al, "A New Approach to Face Composites Construction Superimposition of Whole Face Images", IEE, pp. 3/1–3/4.

S. Morishima et al, "A Facial Image Synthesis System for Human–Machine Interface", IEEE, 1992, pp. 363–368.

*Primary Examiner*—Raymond J. Bayerl
*Assistant Examiner*—U. Chauhan
*Attorney, Agent, or Firm*—Oliff & Berridge

[57] ABSTRACT

A portrait drawing apparatus having a facial part data table comprising data about the correspondence of component facial parts of portraits to different facial expressions. When it is desired to modify the previously drawn portrait of the same person with a different facial expression, the facial parts corresponding to the desired facial expression are determined to replace the applicable old facial parts. Substituting the newly selected facial parts for the old allows the portrait with the designated facial expression to be drawn with ease.

17 Claims, 10 Drawing Sheets

FACIAL PART CANDIDATE TABLE

| PART NO. | FACIAL PART | FACIAL EXPRES-SION | ADDRESS |
|---|---|---|---|
| 1 | EYES | NORMAL | 1000 (H) |
| 2 | EYES | NORMAL | 1050 (H) |
| 3 | EYES | NORMAL | 10C5 (H) |
| 4 | EYES | SMILING | 1130 (H) |
| 5 | EYES | SMILING | ⋮ |
| 6 | EYES | SMILING | ⋮ |
| 7 | EYES | ANGRY | ⋮ |
| 8 | EYES | ANGRY | |
| 9 | EYES | ANGRY | |
| 10 | EYES | CRYING | |
| 11 | EYES | CRYING | |
| 12 | EYES | CRYING | |
| 13 | EARS | NORMAL | |
| 14 | EARS | NORMAL | |

1000(H)
1050(H)
10C5(H)
1130(H)

FACIAL PART IMAGE DATA

PART 1 DATA
PART 2 DATA
PART 3 DATA
PART 4 DATA
⋮

Fig. 3

| PART NO. | NORMAL FACE | SMILING FACE | ANGRY FACE | CRYING FACE |
|---|---|---|---|---|
| 1 | 1 | 4 | 7 | 10 |
| 2 | 2 | 5 | 8 | 11 |
| 3 | 3 | 6 | 9 | 12 |
| 4 | 1 | 4 | 7 | 10 |
| 5 | 2 | 5 | 8 | 11 |
| 6 | 3 | 6 | 9 | 12 |
| 7 | 1 | 4 | 7 | 10 |
| 8 | 2 | 5 | 8 | 11 |
| 9 | 3 | 6 | 9 | 12 |
| 10 | 1 | 4 | 7 | 10 |
| 11 | 2 | 5 | 8 | 11 |
| 12 | 3 | 6 | 9 | 12 |
| 13 | 13 | 21 | 17 | 25 |
| 14 | 14 | 22 | 18 | 26 |
| 15 | 15 | 23 | 19 | 27 |
| 16 | 16 | 24 | 20 | 28 |
| — | — | — | — | — |
| — | — | — | — | — |

PORTRAIT DRAWING APPARATUS HAVING FACIAL EXPRESSION DESIGNATING FUNCTION

This is a Continuation of application Ser. No. 08/069,367 filed Jun. 1, 1993, now abandoned.

BACKGROUND OF THE INVENTION

1. Field of the Invention

The present invention relates generally to a portrait drawing apparatus allowing such facial part patterns as the eyes and nose to be selected as desired and combined into a portrait. More particularly, the invention relates to a portrait drawing apparatus having a facial expression designating function.

2. Description of the Related Art

Conventional portrait drawing apparatuses generally comprise a display unit that displays portrait image data, a memory unit that stores facial part pattern data, and an input unit used to determine the facial parts with which to draw a portrait. The display unit comprises a facial part display area and a portrait drawing area. The facial part display area displays candidates of such facial parts as the eyes, nose, mouth, eyebrows, ears, hair, facial contour, mustache and eyeglasses to choose from. The portrait drawing area is an area in which the operator draws a portrait using the most appropriate facial part candidates displayed in the facial part display area. For example, when the facial part "eyes" is selected, the facial part display area displays such candidates as big eyes, small eyes, round eyes, narrow eyes, sad eyes and angry eyes. The most appropriate of these candidates is selected and positioned where required. In like manner, other facial parts are selected from among a plurality of candidates thereof, until a portrait is completed.

One disadvantage of the prior art portrait drawing apparatus is that when it is desired to modify a previously drawn portrait of the same person with a different facial expression, it is necessary to draw the portrait anew using different facial part candidates representing the desired expression. Another disadvantage is the difficulty encountered in determining the appropriate candidates giving the new expression. That is, to provide a variety of facial expressions requires searching through a vast number of facial part candidates. A further disadvantage is that one or more facial parts modified to represent a different facial expression often fail to go well with the remaining facial parts. The result is an awkward portrait composed of unmatched parts.

SUMMARY OF THE INVENTION

It is therefore an object of the present invention to overcome the above and other deficiencies and disadvantages of the prior art and to provide a portrait drawing apparatus having a facial expression designating function, the apparatus having information about how each facial part corresponds to the remaining parts for a different facial expression, so that when a portrait of a different facial expression is designated to be drawn based on the previously drawn portrait of the same person, the facial parts forming the old portrait are replaced by those reflecting the new facial expression, whereby the portrait of the same person with the different facial expression is obtained with ease.

In carrying out the invention and according to one aspect thereof, there is provided a portrait drawing apparatus having a facial expression designating function, comprising: display function for displaying at least a portrait and candidates of the facial parts thereof; memory means for storing data on a plurality of facial parts constituting each portrait; selecting means for selecting facial parts from the facial part candidates stored in the memory means; a facial part data table for storing data about the facial parts corresponding to different facial expressions; designating means for designating a facial expression; determining means for determining the facial parts corresponding to the facial expression designated by the designating means on the basis of the facial part data table; and control means for substituting the facial parts determined by the determining means for the corresponding old facial parts.

In operation, the selecting means selects facial parts from among the facial part candidates stored in the memory means. The selected facial parts are combined into a portrait and displayed on the display means. The determining means determines each of the facial parts corresponding to the facial expression designated by the designating means on the basis of the facial part data table. The control means substitutes the facial parts determined by the determining means for the applicable old facial parts, whereby the portrait of the newly designated facial expression is drawn.

These and other objects, features and advantages of the invention will become more apparent upon a reading of the following description and appended drawings.

BRIEF DESCRIPTION OF THE DRAWINGS

FIG. 6 is a further flowchart of steps in

DESCRIPTION OF THE PREFERRED EMBODIMENT

Figure 1:
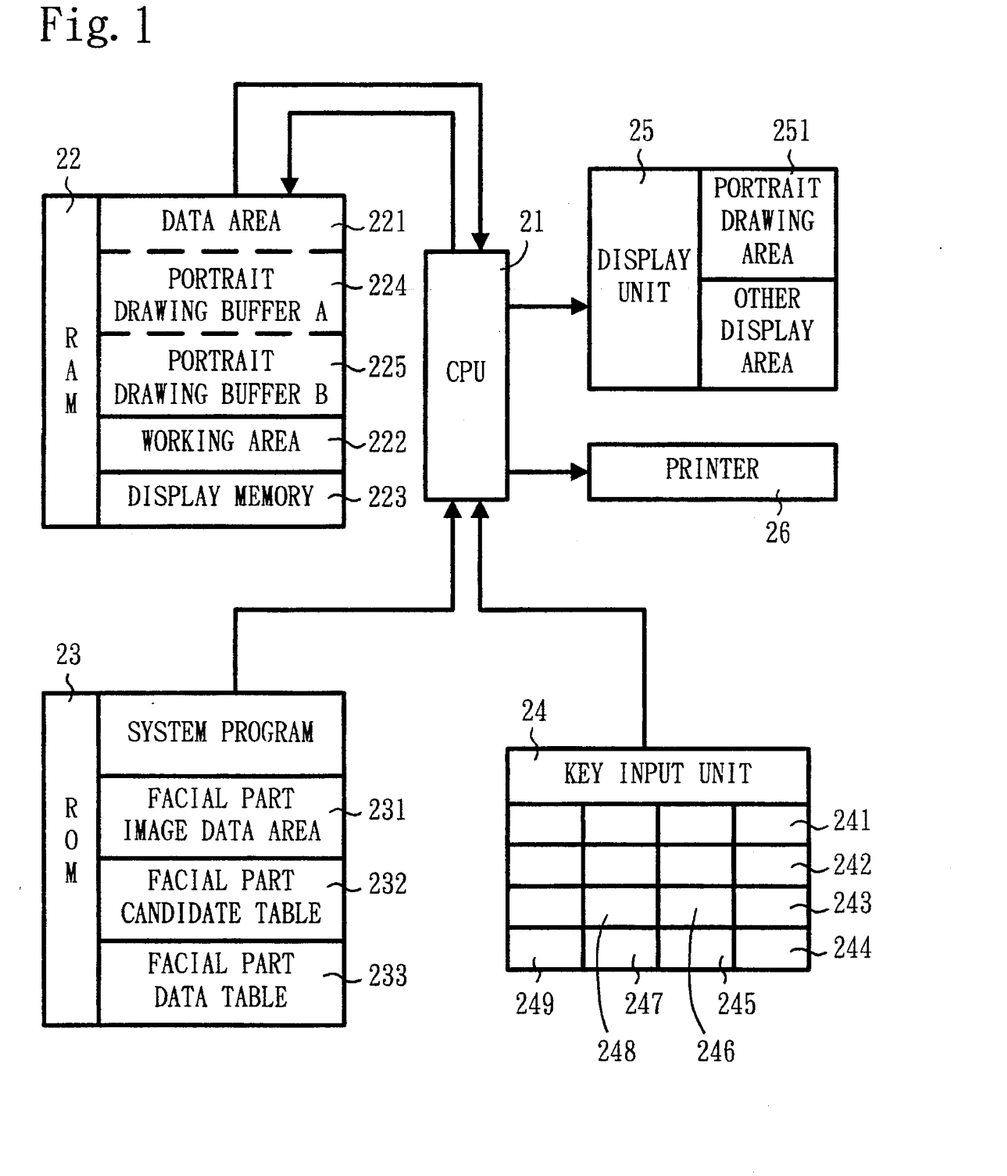
FIG. 1 is a block diagram of a portrait drawing apparatus embodying the present invention.

One preferred embodiment of the invention will now be described with reference to the accompanying drawings. FIG. 1 is a block diagram of the portrait drawing apparatus embodying the present invention. As indicated, the embodiment comprises a central processing unit (CPU) 21, a RAM 22, a ROM 23, a key input unit 24, a display unit 25 and a printer 26. The RAM 22, ROM 23, key input unit 24, display unit 25 and printer 26 are all controlled by the CPU 21.

The RAM 22 includes a data area 221 for storing various data, a working area 222 in which programs are executed, and a display memory 223 in which to write display data. The data area 221 contains a portrait drawing buffer A 224 and a portrait drawing buffer B 225 in which to write the numbers of selected facial parts.

Figure 2:
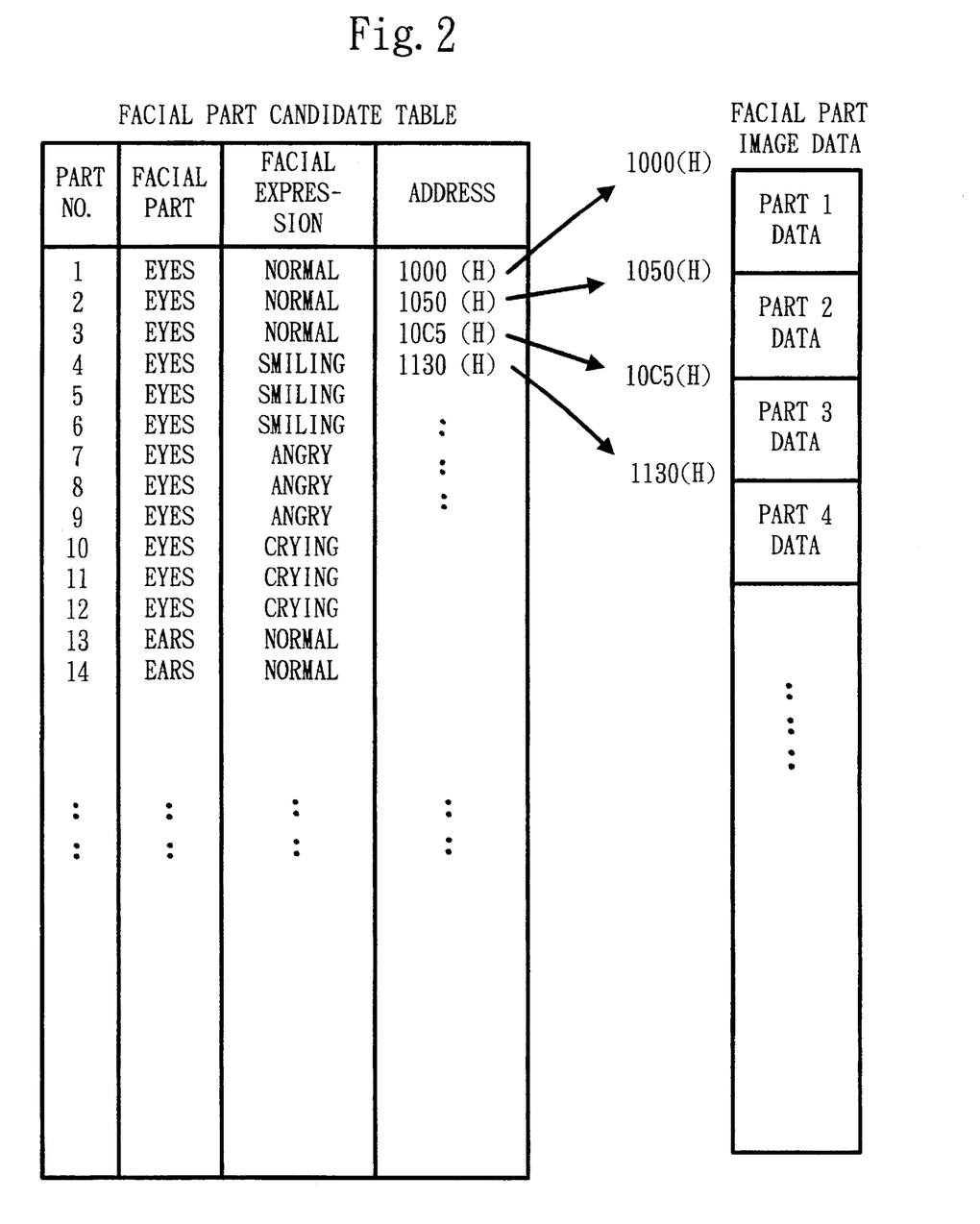
FIG. 2 is a schematic view of a typical facial part candidate table used by the embodiment.
Figure 3:
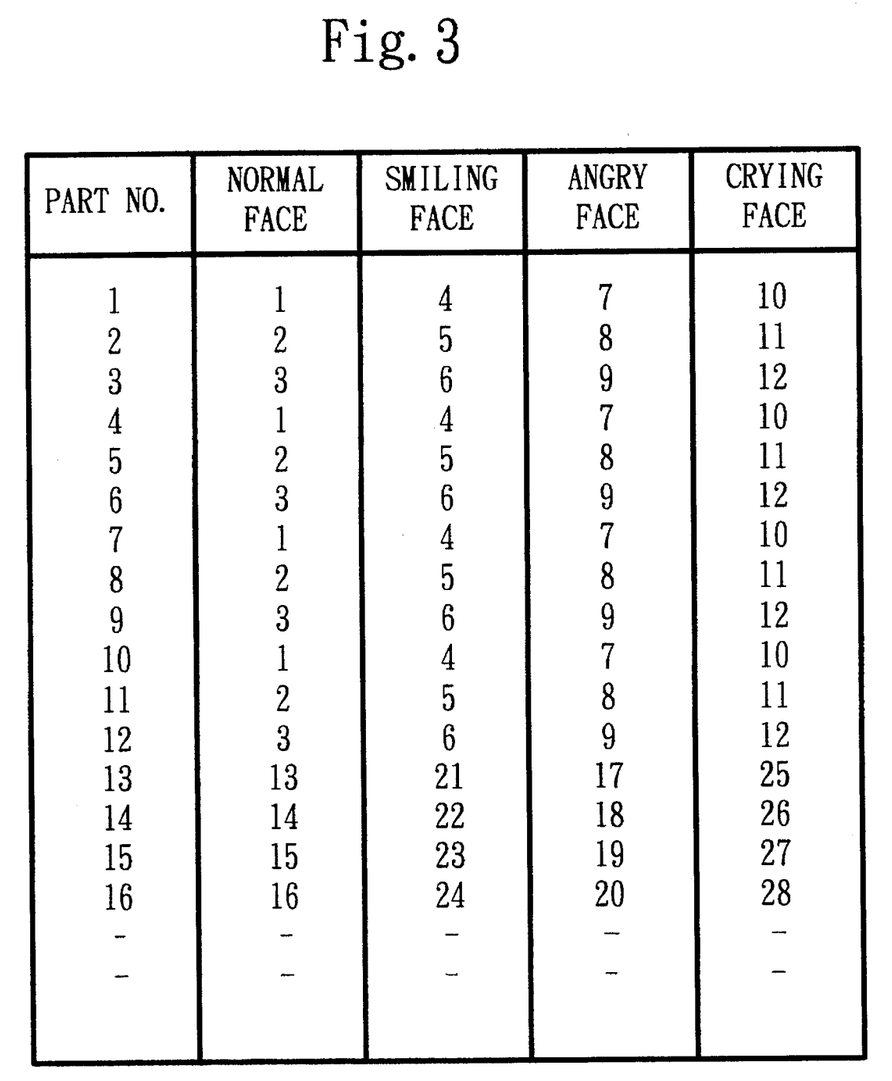
FIG. 3 is a schematic view of a typical facial part data table used by the embodiment.

The ROM 23 contains the system program that controls the entire system; a facial part image data area 231 that stores image data on the facial parts; a facial part candidate table 232 that contains the facial part number, the facial part name, the facial expression, and the start address at which the image data on the part are stored for each facial part; and a facial part data table 233 that contains data about which candidate of each facial part corresponds to which facial expression. FIG. 2 shows a typical facial part candidate table and FIG. 3 depicts a typical facial part data table.

The key input unit 24 has function keys 241 through 248 with which to select facial parts and candidates for these parts. The key input unit 24 also has an end key 249 to terminate the ongoing process.

The display unit 25 has a portrait drawing area 251 in which a portrait to be drawn is displayed, and another display area in which candidates for facial parts, various messages and so on are displayed.

The printer 26 is provided to print the completed portrait on paper.

Figure 4:
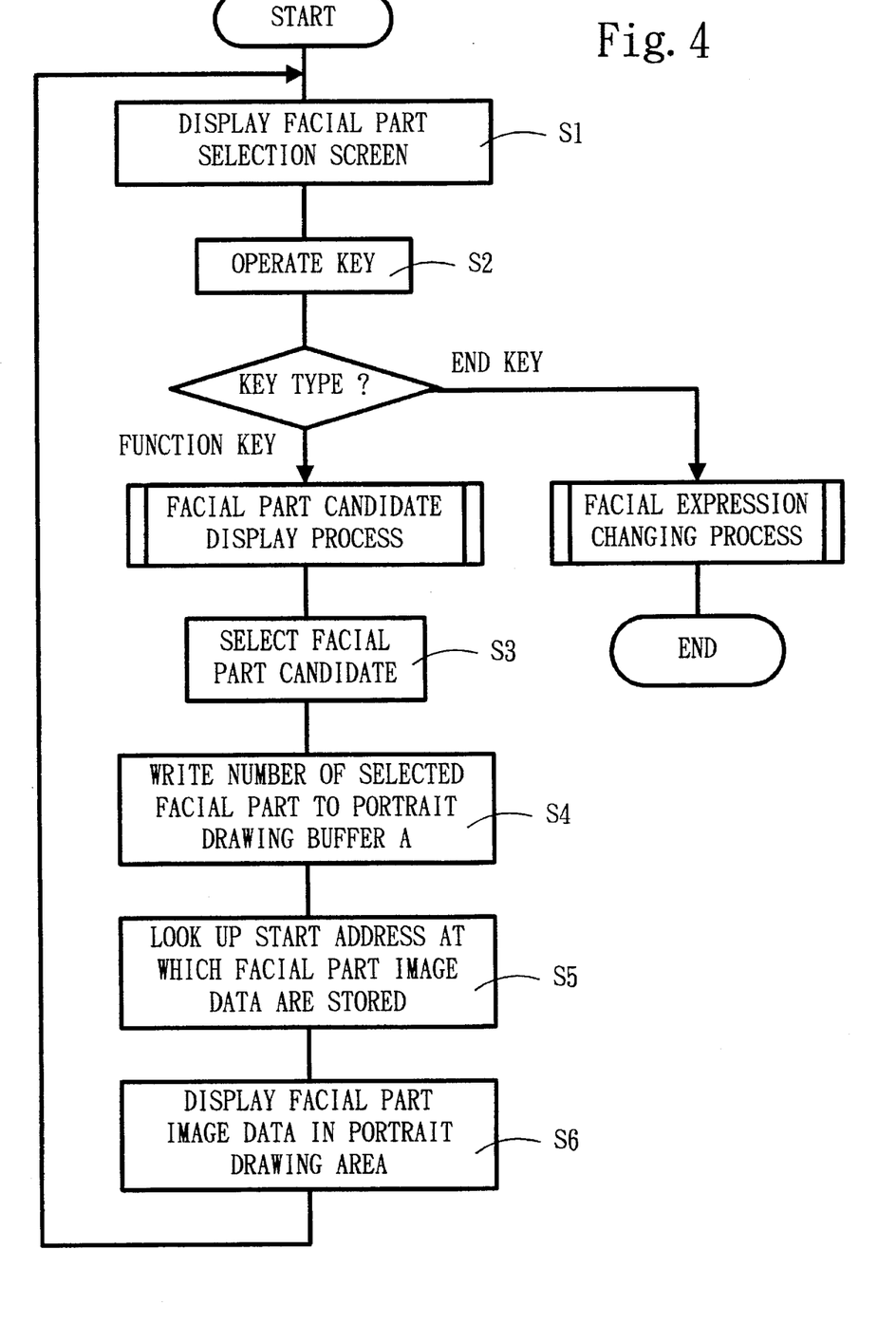
FIG. 4 is a flowchart of steps in which the embodiment works.
Figure 5:
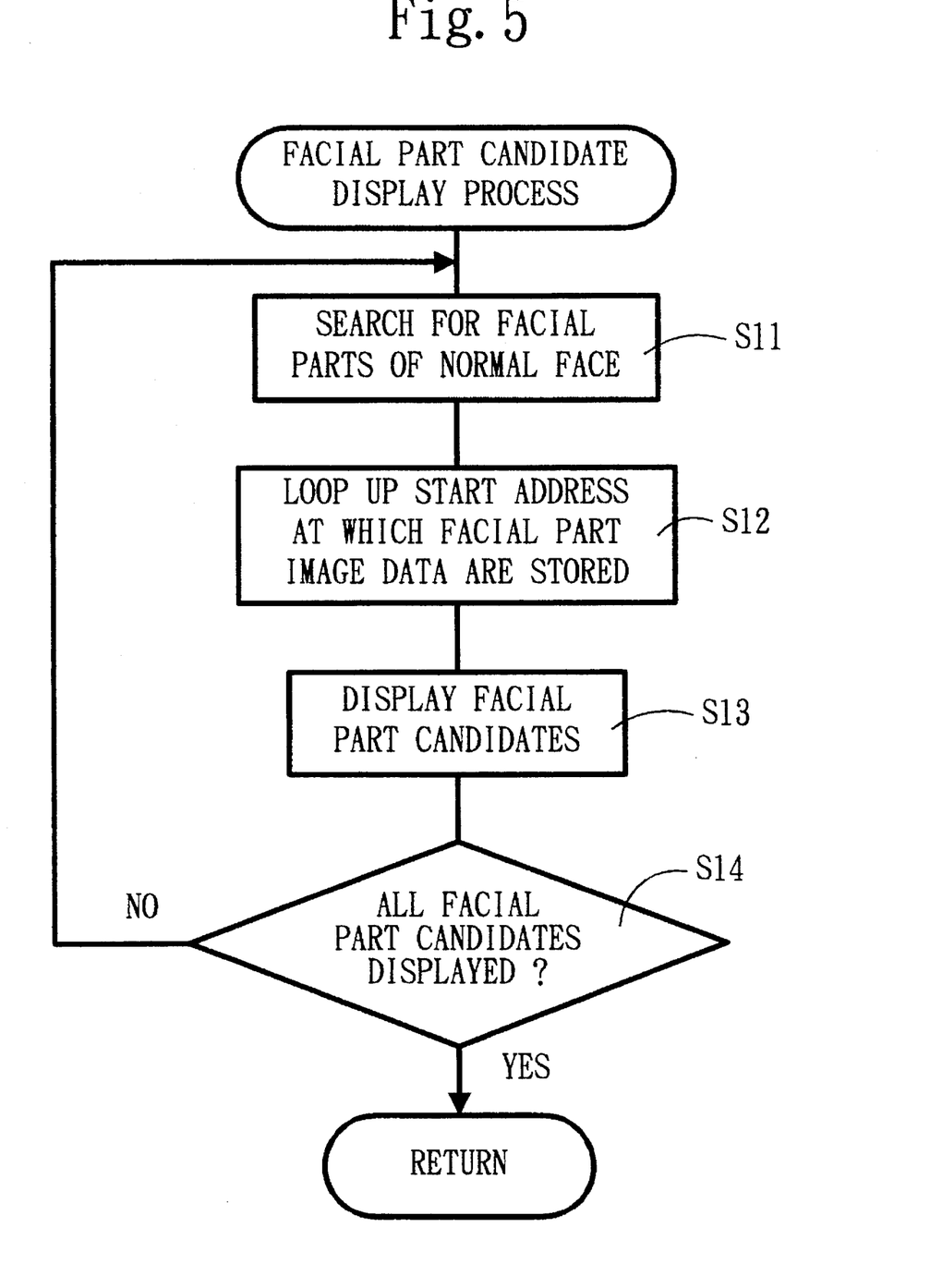
FIG. 5 is another flowchart of steps in which the embodiment works.
Figure 6:
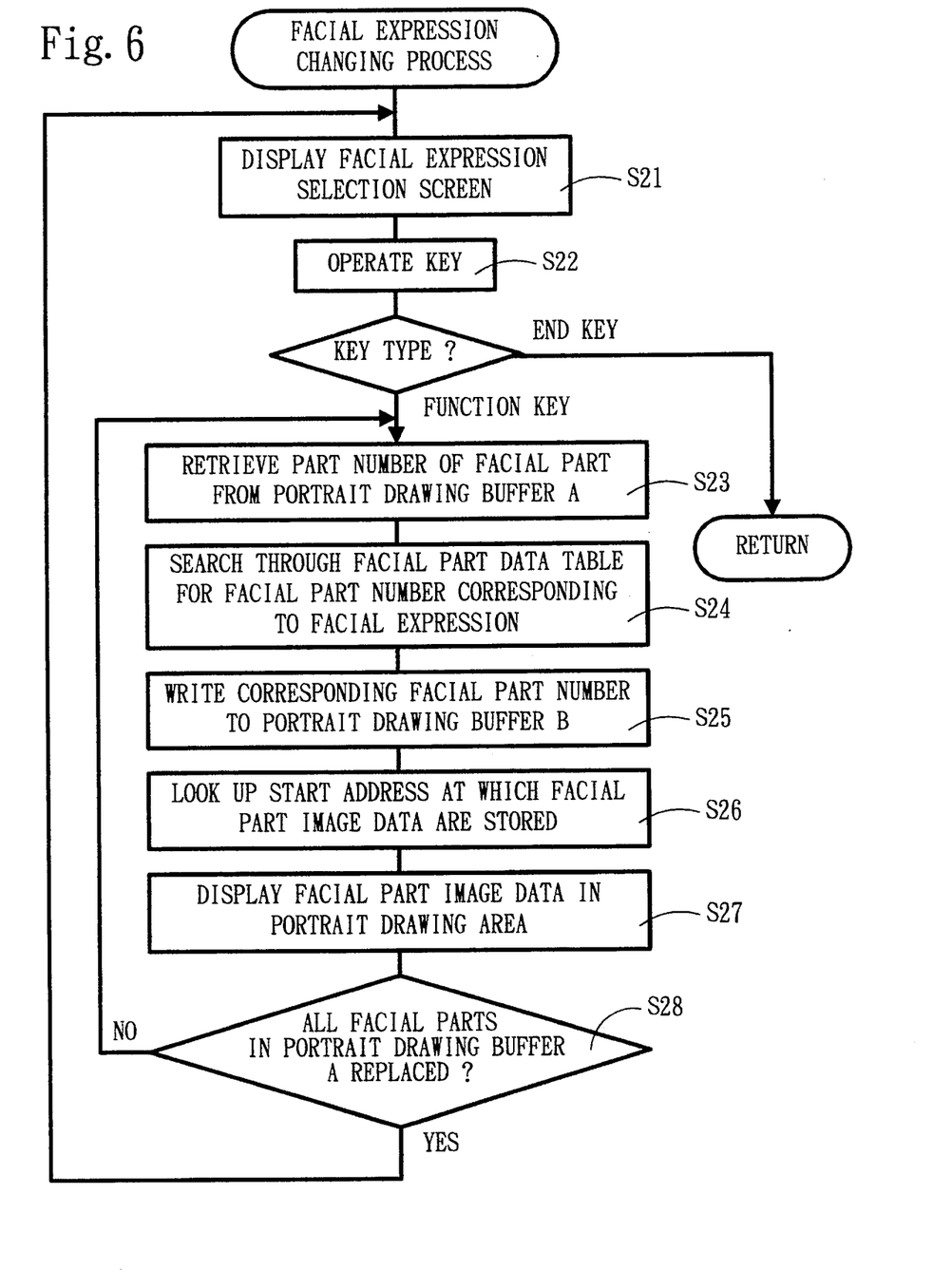
Figure 7:
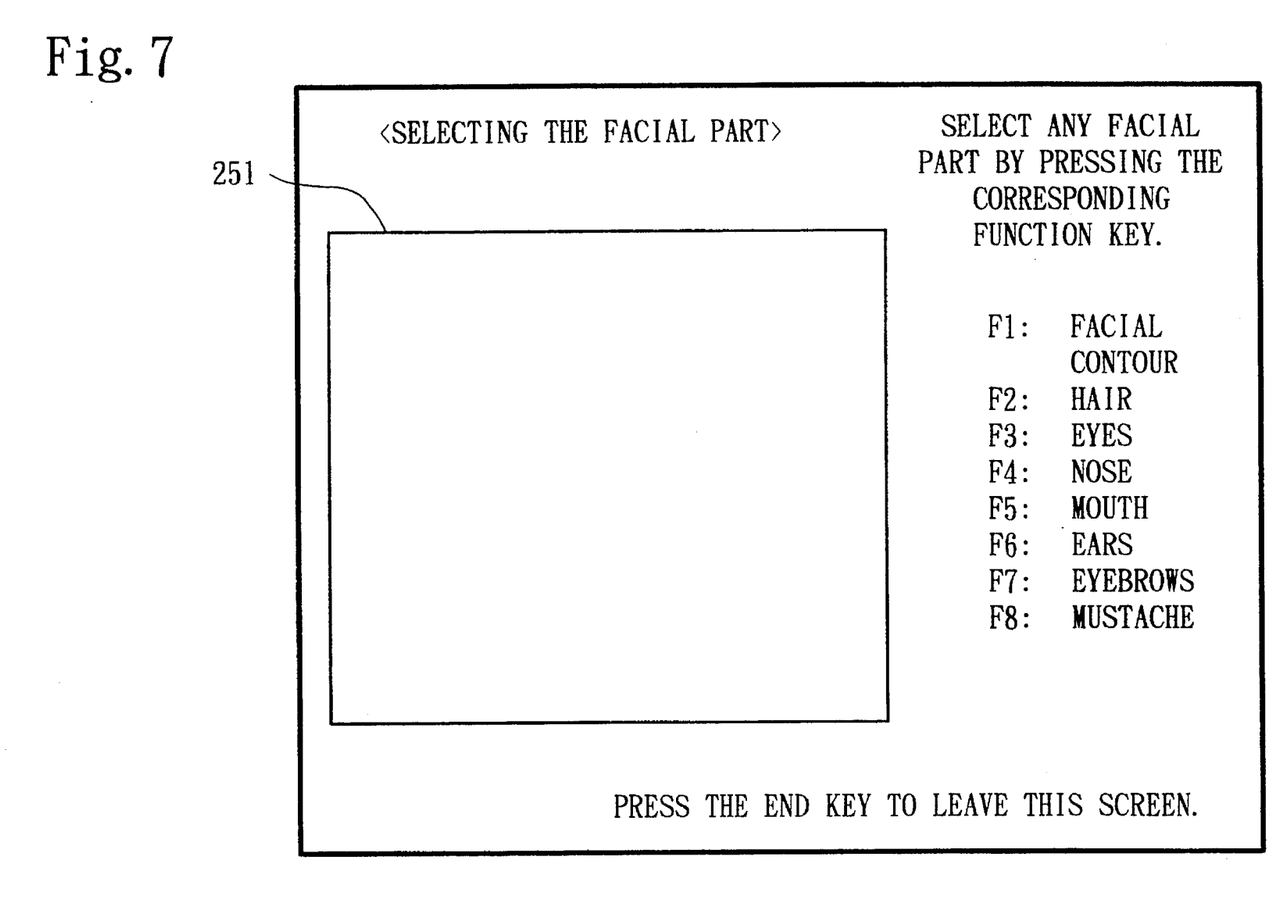
FIG. 7 is a view of a typical facial part selection screen of the embodiment.
Figure 8:
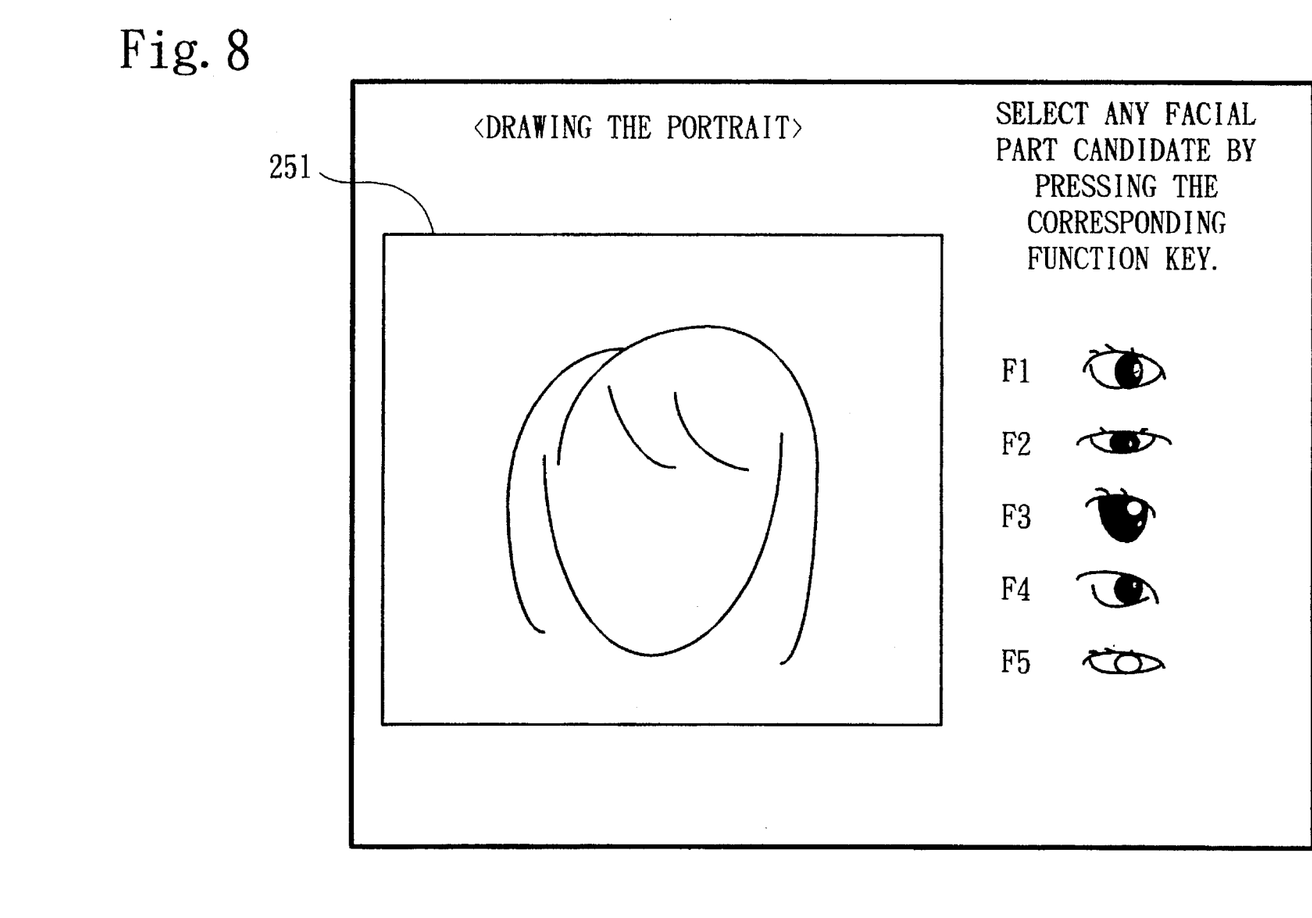
FIG. 8 is a view of a typical facial part candidate display screen of the embodiment.

How the embodiment of the above constitution works will now be described with reference to the flowcharts of FIGS. 4 through 6. Applying power to the apparatus starts and executes the system program in the ROM 23. With the system program executed, the facial part selection screen of FIG. 7 appears on the display unit 25. On this screen of the embodiment, the operator is allowed to select any of such facial parts as the facial contour, hair, eyes, nose, mouth, ears, eyebrows and mustache (step 1 of FIG. 4). The operator pushes a function key on the key input unit 24 to select a desired facial part (step 2). With the facial part selected by operation of the appropriate function key, a facial part candidate display process is initiated and candidates of that facial part are displayed on the screen. That is, those candidates of the selected facial part which correspond to the normal facial expression are searched in the facial part candidate table 232 (step 11 of FIG. 5). The start address at which the image data for that facial part are stored is looked up in the facial part candidate table 232 (step 12). The image data for the facial part are retrieved from the facial part image data area 231 and displayed as candidates, as shown in FIG. 8 (step 13). A check is made to see if those candidates of the selected facial part which correspond to the normal facial expression are all displayed (step 14). If there still remain candidates to be displayed, steps 11 through 14 are repeated until all candidates have been displayed. With all candidates of the selected facial part displayed, the facial part candidate display process comes to an end.

The operator decides on one of the facial part candidates displayed, and presses an appropriate function key (step 3). With the facial part candidate thus selected by operation of the appropriate key, the part number of the selected facial part is written to the portrait drawing buffer A 224 (step 4). The address at which the image data on the selected facial part are stored is looked up in the facial part candidate table 232 (step 5). The image data on the selected facial part are retrieved from the facial part image data area 231 and displayed in the portrait drawing area 251 (step 6).

With the image data on the selected facial part displayed, step 1 is reached and the facial part selection screen is again displayed. Where necessary, the operator turns to another facial part and starts selecting the most appropriate candidate thereof.

Figure 9:
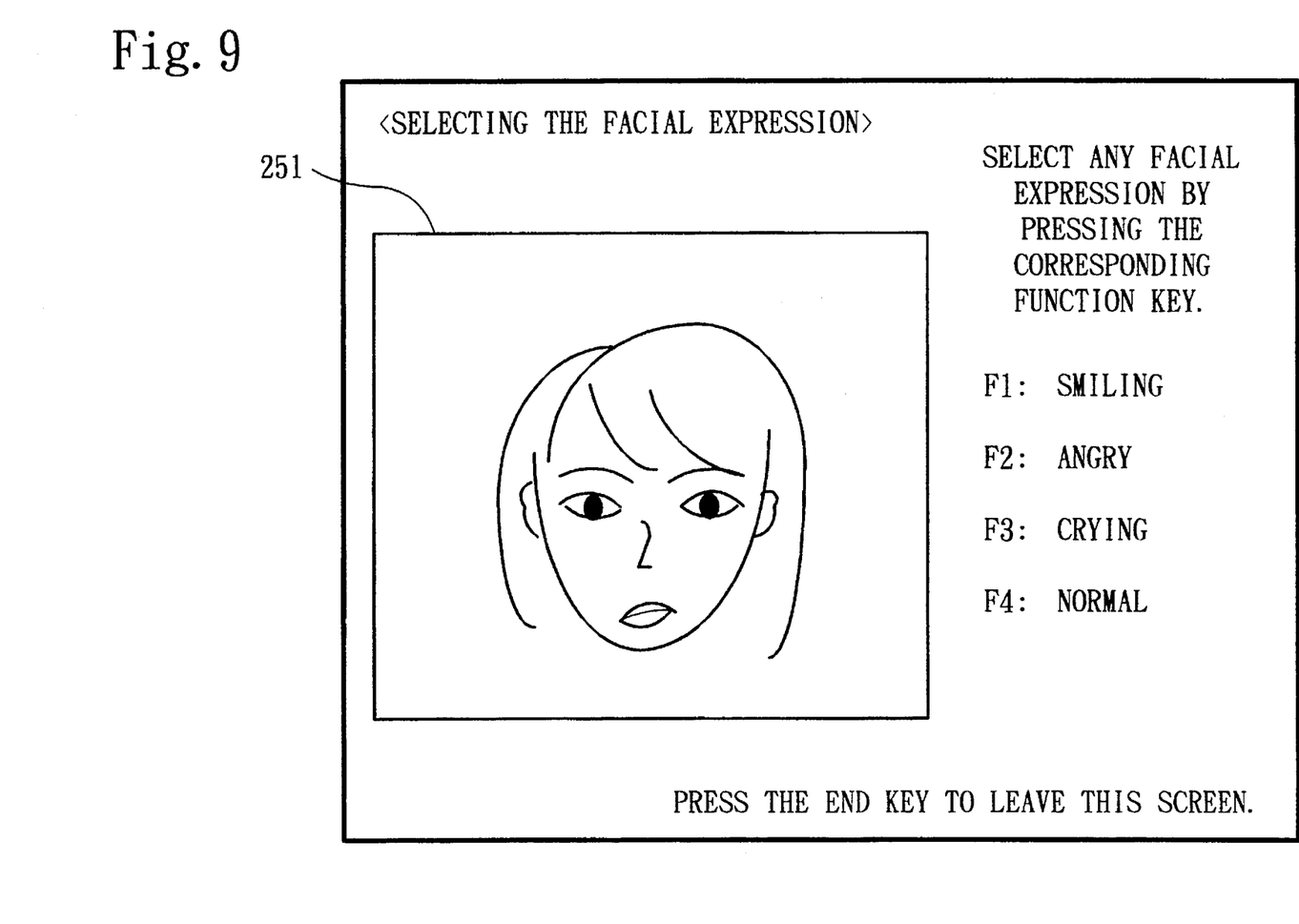
FIG. 9 is a view of a typical facial expression selection screen of the embodiment.

When the operator has selected all facial parts necessary to draw the portrait, the operator pushes the end key 249 to terminate the portrait drawing process, a facial expression changing process is initiated. The facial expression selection screen of FIG. 9 appears (step 21). The operator decides on one of the facial expression candidates displayed, and selects it by pressing an appropriate key (step 22). With the facial expression selected, the facial part number written in the portrait drawing buffer A 224 is retrieved therefrom (step 23). The facial part data table 233 is searched for the facial part number, and the part number corresponding to the selected facial expression for the facial part in question is retrieved from the table (step 24).

For example, suppose that the portrait drawing buffer A 224 contains a part number of "2" and that the desired facial expression is an "angry" expression. In that case, a search for the facial part "2" is made in the facial part data table of FIG. 3. When the facial part "2" is detected, a facial part "8" corresponding to the facial part "2" of the angry expression is retrieved.

Figure 10:
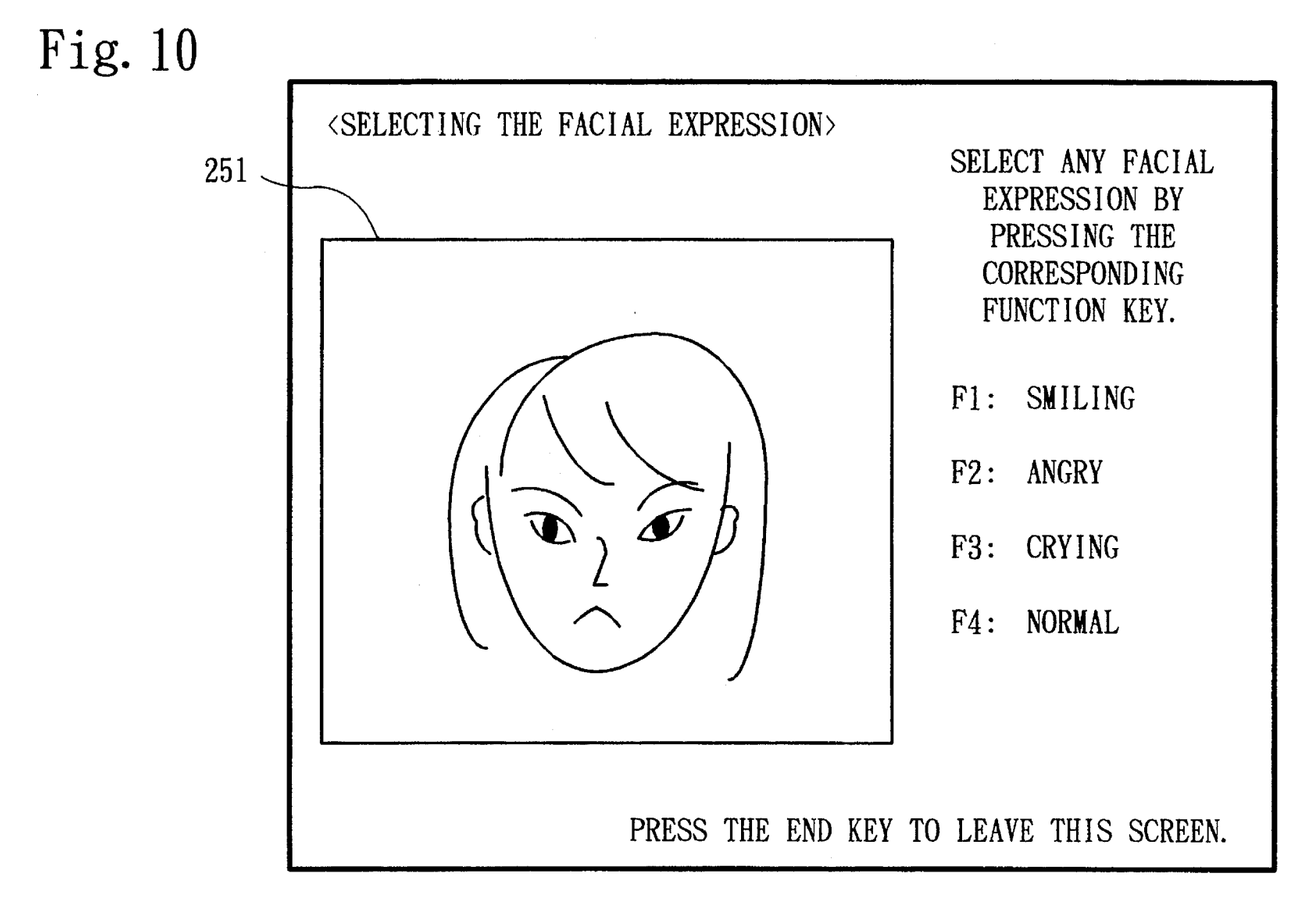
FIG. 10 is a view of a displayed portrait in which the facial expression is changed by the embodiment.

The facial part number thus retrieved is written to the portrait drawing buffer B 225 (step 25). In the facial part candidate table 232, the address at which the image data on the facial part of the part number are stored is looked up (step 26). The image data are retrieved from the facial part image data area 231 and displayed in the portrait drawing area 251 (step 27). A check is made to see if all part numbers written in the portrait drawing buffer A 224 have been addressed and replaced with the appropriate parts of the desired facial expression (step 28). If there still remain facial parts to be replaced, step 21 is reached again and the subsequent steps are repeated from there. When all necessary facial parts have been replaced with the new parts of the new facial expression, the portrait is completed. FIG. 10 shows a typical portrait displayed with its facial expression changed.

Thereafter, the facial expression selection screen is again displayed. If another facial expression is selected on that screen, step 22 is reached and the subsequent steps are repeated from there. Selecting an end to the portrait drawing process terminates it.

As described, the portrait drawing apparatus according to the invention has the facial part data table comprising data about the correspondence of component facial parts of a portrait to different facial expressions. The facial parts corresponding to the desired facial expression are determined on the basis of the facial part data table. The facial parts thus determined replace the applicable old facial parts, whereby the portrait of the newly designated facial expression is drawn with ease.

Although the description above contains many specificities, these should not be construed as limiting the scope of the invention but as merely providing illustrations of the presently preferred embodiment of this invention. For example, the process of step 13 in the flowchart of FIG. 5 may be modified as follows: A next candidate key may be provided on the key input unit. Every time the operator operates the next candidate key, the next candidate of the facial part in question may be displayed successively and directly in the portrait drawing area 251 of FIG. 8.

In another modification, the above embodiment may utilize a ROM arrangement to accommodate the system program, the portrait image data and the facial part data table containing facial parts corresponding to different facial expressions. In a further modification, the system program, the portrait image data, the facial part data table and the data of completed portraits may be written to and read from an external memory unit. Any of the data held in the external memory unit may be read into an internal RAM when needed for processing.

Thus, the scope of the invention should be determined by the appended claims and their legal equivalents, rather than by the examples given.

What is claimed is:

1. A portrait drawing apparatus having a facial expression designating function, comprising:

display means for displaying at least a portrait having facial parts and candidates of the facial parts thereof;

memory means for storing data on a plurality of facial parts;

selecting means for selecting facial parts from the candidates of facial parts stored in said memory means;

a facial part data table for storing data about the facial parts corresponding to different facial expressions;

designating means for designating a new facial expression;

control unit determining means for determining which facial parts have to be changed to corresponding to the new facial expression designated by said designating means on the basis of said facial part data table; and control unit substituting means for automatically substituting the facial parts determined by said control unit determining means for the facial expression designated by said designating means for facial parts corresponding to an old facial expression.

2. The portrait drawing apparatus as claimed in claim 1, further comprising a second memory means having a first drawing buffer and a second drawing buffer.

3. The portrait drawing apparatus as claimed in claim 2, wherein a completed portrait consisting of facial parts selected by said selecting means is stored in said first drawing buffer.

4. The portrait drawing apparatus as claimed in claim 2, wherein a completed expression portrait is stored in said second drawing buffer.

5. The portrait drawing apparatus as claimed in claim 1, wherein said determining means includes a facial part candidate table to determine which facial parts to substitute.

6. The portrait drawing apparatus as claimed in claim 3, wherein the completed portrait has a facial expression.

7. A portrait drawing apparatus, comprising:

a display;

a control means for controlling the portrait drawing apparatus;

a first memory means for storing a plurality of facial parts with a plurality of candidates for each of the facial parts and alternative expressions for each of the plurality of candidates;

a second memory means for storing completed portraits, said completed portraits including a selected candidate for each of the facial parts and and expression for the selected candidates of the facial parts; and means for selecting facial parts, candidates of facial parts, alternative expressions for the candidates of the facial parts and determining with said control means which facial parts have to be changed to correspond to the selected alternative expression.

8. The portrait drawing apparatus as claimed in claim 7, wherein said second memory means has a first portrait drawing buffer and a second portrait drawing buffer.

9. The portrait drawing apparatus as claimed in claim 8, wherein a completed portrait is stored in said first portrait drawing buffer, said completed portrait comprises a portrait made up of a selected candidate for each of the facial parts.

10. The portrait drawing apparatus as claimed in claim 9, wherein the completed portrait has a facial expression.

11. The portrait drawing apparatus as claimed in claim 9, wherein said second portrait drawing buffer stores the completed portrait having an alternative expression applied to the selected candidate for each of the facial parts.

12. A method of creating a portrait using an automated portrait drawing apparatus, comprising the steps of:

displaying a facial part selection screen;

selecting a facial part;

selecting an option of the selected facial part for adding to the portrait;

storing said selected option in a first portrait drawing buffer;

displaying said selected option on a display;

repeating the selecting of a facial part through displaying steps until a complete portrait having a facial expression is produced; and executing a facial expression changing process by selecting a new facial expression for changing the facial expression of the complete portrait to the new facial expression and determining with a control unit which facial parts have to be changed to correspond to the new facial expression.

13. The method as claimed in claim 12, wherein the step of executing a facial expression changing process includes the steps of displaying a facial expression selection screen on the display;

selecting a facial expression; and substituting expressive facial parts determined to correspond to the new facial expression for all of the previously selected facial parts.

14. The method as claimed in claim 13, wherein said substituting step comprises a sequential replacement of facial parts.

15. The method as claimed in claim 13, wherein said substituted facial parts are stored in a second portrait drawing buffer to produce a portrait having the selected facial expression.

16. The method as claimed in claim 13, wherein said substituted facial parts are displayed on the display by replacing the facial parts originally selected.

17. The portrait drawing apparatus according to claim 7 further comprising:

control unit substituting means for automatically substituting the facial parts determined by said selecting means of the selected alternative expression designated for facial parts corresponding to an old facial expression.

* * * * *